US011177717B2

(12) United States Patent
Kain

(10) Patent No.: US 11,177,717 B2
(45) Date of Patent: Nov. 16, 2021

(54) KINETIC ENERGY STORAGE

(71) Applicant: Guy Kain, Clyo, GA (US)

(72) Inventor: Guy Kain, Clyo, GA (US)

(*) Notice: Subject to any disclaimer, the term of this patent is extended or adjusted under 35 U.S.C. 154(b) by 170 days.

(21) Appl. No.: 16/590,042

(22) Filed: Oct. 1, 2019

(65) Prior Publication Data

US 2021/0099051 A1    Apr. 1, 2021

(51) Int. Cl.
*H02K 7/02* (2006.01)
*H02K 1/17* (2006.01)
*H02K 1/14* (2006.01)

(52) U.S. Cl.
CPC ............ *H02K 7/025* (2013.01); *H02K 1/145* (2013.01); *H02K 1/17* (2013.01)

(58) Field of Classification Search
CPC   H02K 7/02; H02K 7/025; H02K 1/17; H02K 1/145
See application file for complete search history.

(56) References Cited

U.S. PATENT DOCUMENTS

| 2006/0038456 | A1* | 2/2006 | Bojiuc | H02K 23/04 310/156.32 |
| 2015/0381012 | A1* | 12/2015 | Dugas | H02K 7/108 310/74 |
| 2018/0351446 | A1* | 12/2018 | Wong | H02K 7/1807 |
| 2019/0140514 | A1* | 5/2019 | Miner | H02K 21/021 |

* cited by examiner

*Primary Examiner* — Naishadh N Desai
(74) *Attorney, Agent, or Firm* — Cochran Freund & Young LLC; William O'Meara

(57) ABSTRACT

A device for storing kinetic energy including a base assembly supporting a central vertical shaft and having a first ring of magnets mounted thereabout at a first radial distance from the central vertical shaft; and a rotatable disc rotatably mounted on the central vertical shaft and vertically displaceable on the central vertical shaft, the rotatable disc having a fixedly mounted second ring of magnets that are radially spaced from the central vertical shaft by approximately the first radial distance, wherein the rotatable disc weightlessly levitates above the first ring of magnets and has reduced gyroscopic precession forces.

13 Claims, 3 Drawing Sheets

KINETIC ENERGY STORAGE

BACKGROUND

The present application deals with energy storage and, more specifically, with storage of kinetic energy with a levitating rotating disc.

SUMMARY

A device for storing kinetic energy including a base unit having a central portion and a peripheral portion and having an upright orientation; a central shaft having a central axis, the central shaft being mounted on the base unit in a vertical orientation when the base unit is in the upright orientation. A first plurality of magnets, each have opposite magnetic poles and a polar axis extending between the opposite magnetic poles, the first plurality of magnets fixedly mounted about the peripheral portion of the base unit with the polar axes of the first plurality of magnets having a vertical orientation when the base unit is in the upright orientation. A rotatable disc is rotatably and vertically displaceably mounted on the central shaft and supports a second plurality of magnets. The second plurality of magnets each have opposite magnetic poles and a polar axis extending between the opposite magnetic poles. The polar axes of the second plurality of magnets are oriented vertically when the base unit is in the upright orientation. An upper disc is positioned above the rotatable disc and mounted on the central shaft in coaxial alignment therewith, the upper disc supporting a third plurality of magnets each having opposite magnetic poles and a polar axis extending between the opposite magnetic poles with the polar axes of the third plurality of magnets oriented vertically when the base unit is in the upright orientation. The first, second and third plurality of magnets co-act to levitate the rotatable disc and maintain it in spaced apart relationship with the base unit.

A device for storing kinetic energy including a base assembly supporting a central vertical shaft and having a first ring of magnets mounted thereabout at a first radial distance from the central vertical shaft; and a rotatable disc rotatably mounted on the central vertical shaft and vertically displaceable on the central vertical shaft, the rotatable disc having a fixedly mounted second ring of magnets that are radially spaced from the central vertical shaft by approximately the first radial distance, wherein the rotatable disc weightlessly levitates above the first ring of magnets and is subject to reduced gyroscopic precession forces.

A method of storing energy including non-touchingly suspending a rotatable disc that supports a first plurality of magnets between a second and third array of magnets positioned above and below the rotatable disc, respectively; and rotating the rotatable disc.

DETAILED DESCRIPTION

Figure 1:
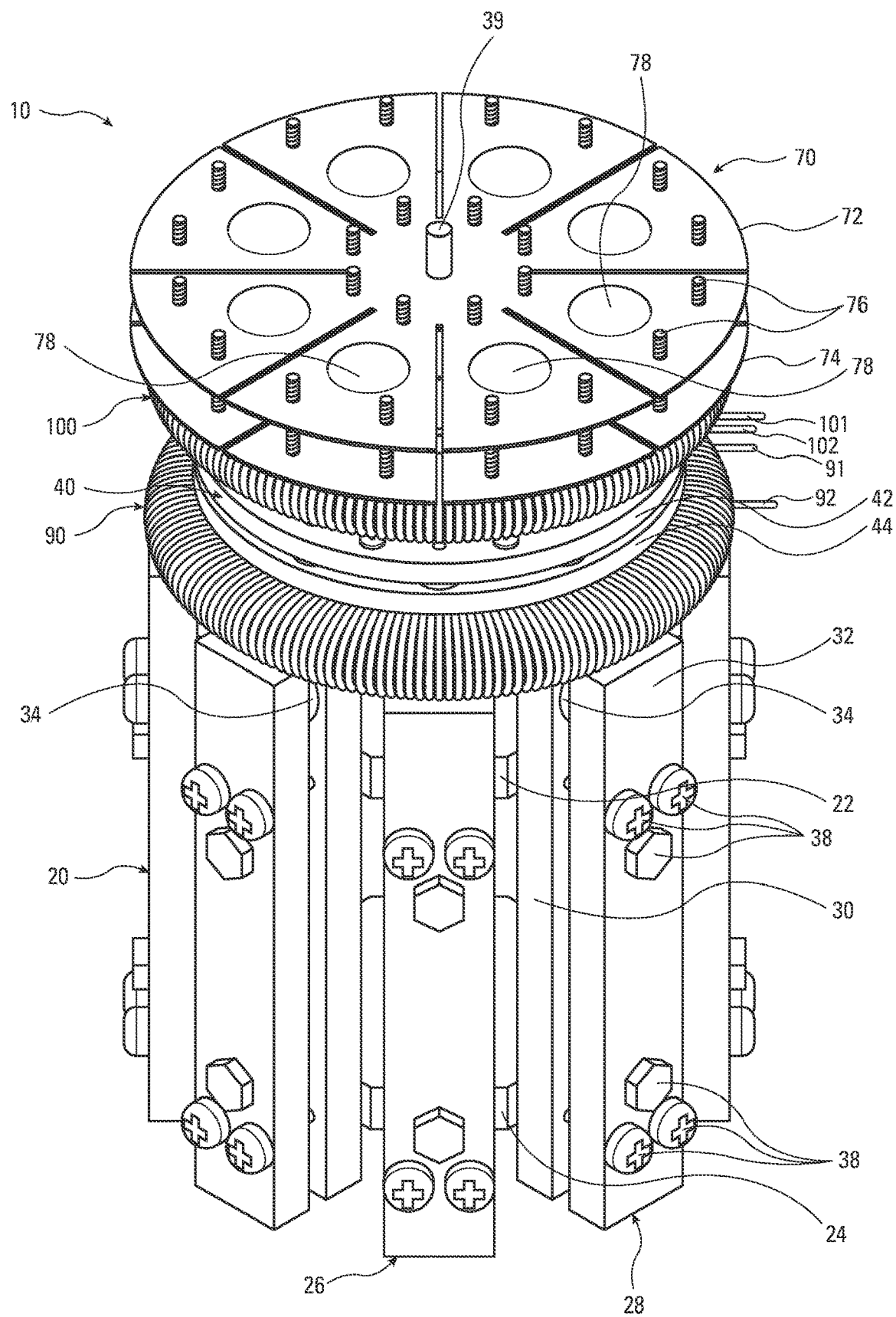
FIG. 1 is an isometric view of a kinetic energy storage device.
Figure 2:
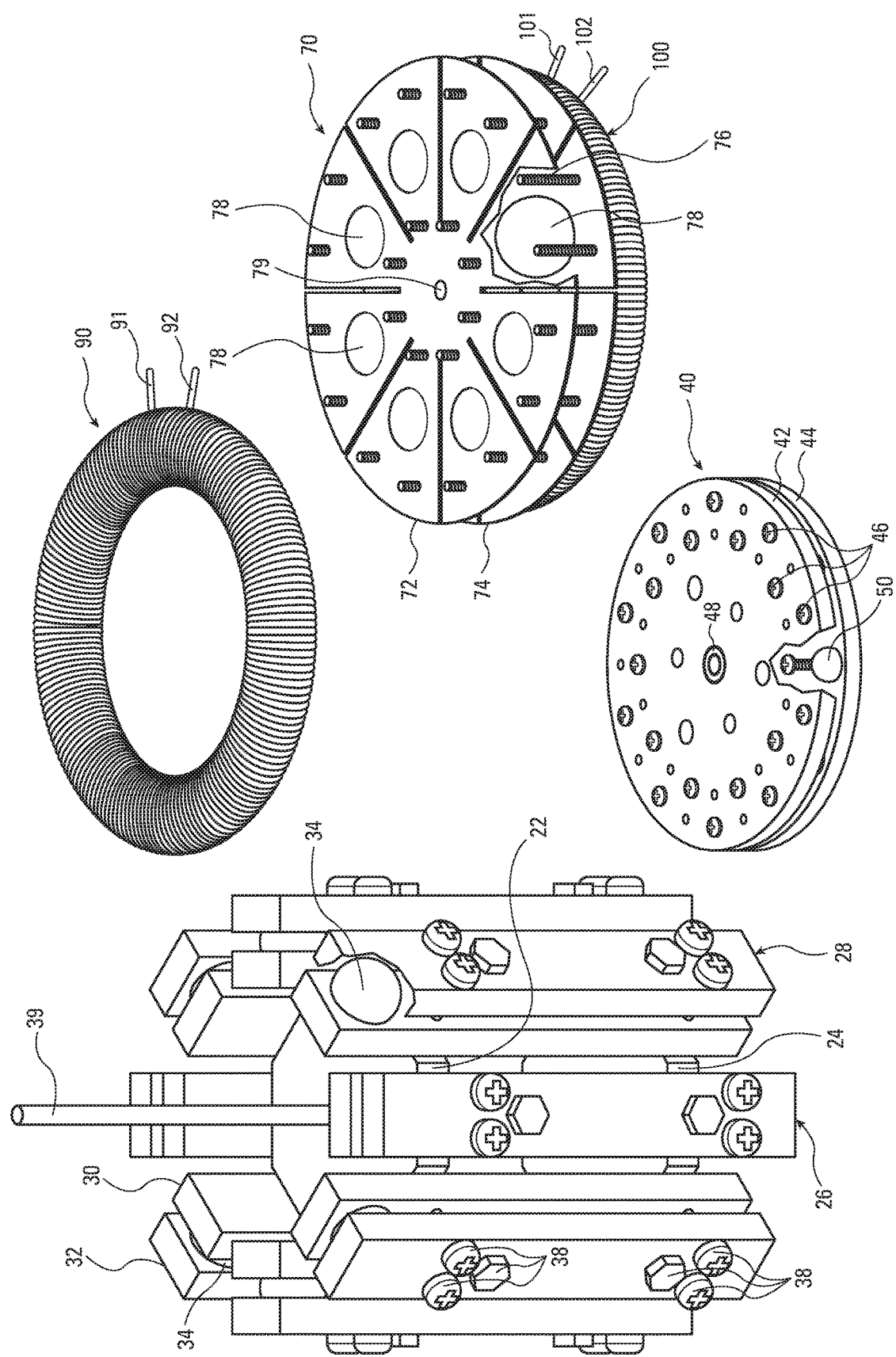
FIG. 2 is an exploded, partially broken away, isometric view of the kinetic energy storage device of FIG. 1.
Figure 3:
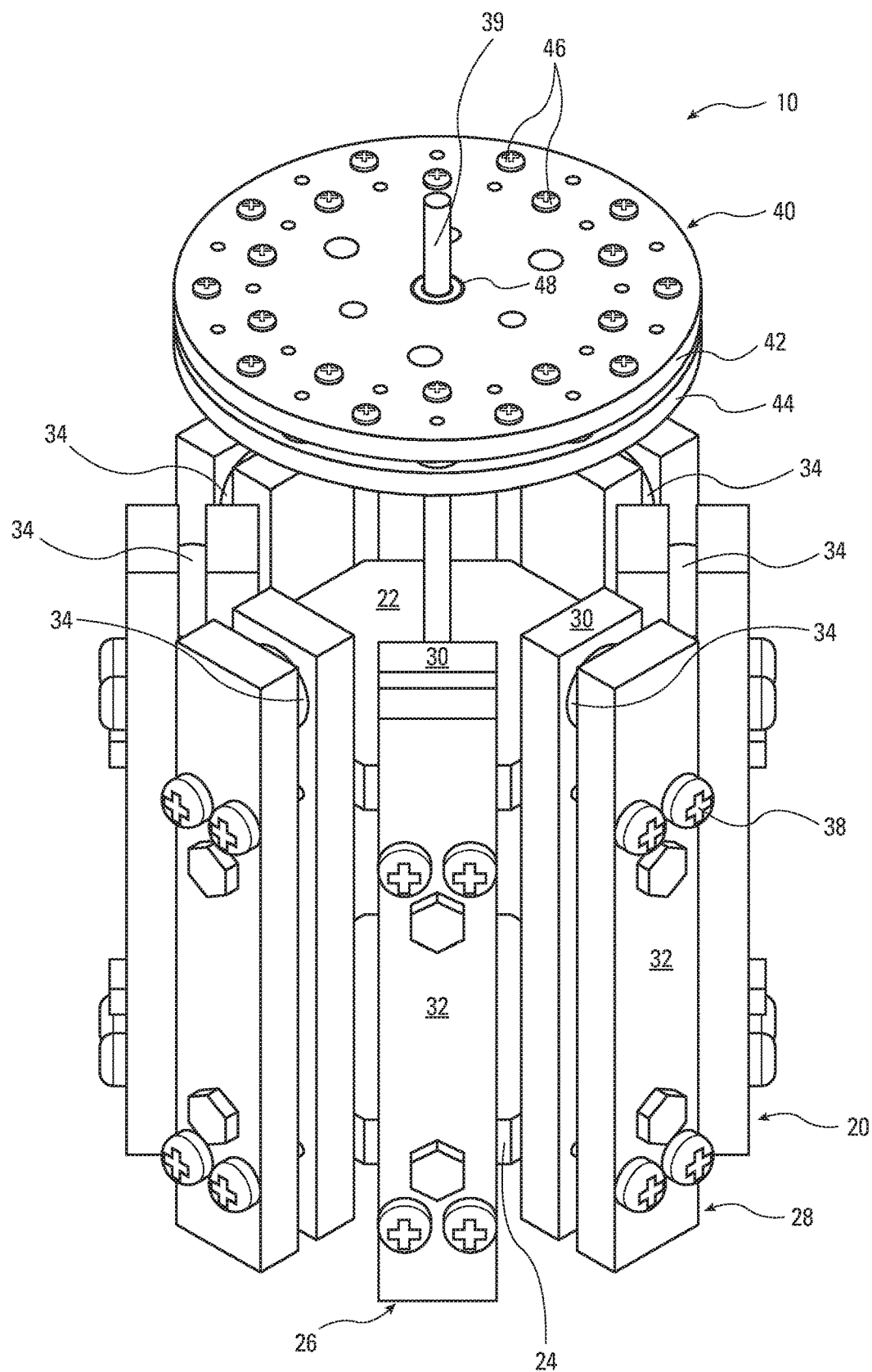
FIG. 3 is an isometric view of the kinetic energy storage device of FIG. 1 in a partially assembled state.

FIG. 1 is an isometric view of a kinetic energy storage device 10 shown in an upright and fully assembled operating state. The device 10 includes a base unit 20 that is also shown in FIGS. 2 and 3. The base unit 20, in the illustrated embodiment, includes two parallel aluminum plates 22, 24. The plates 22, 24 are each octangular in shape and may be identical. The base unit also includes a plurality of leg assemblies 26, 28, etc. In the illustrated embodiment there are eight leg assemblies, each being attached to one of the 8 faces of each octagonal plate 22, 24, etc., as best shown in FIGS. 1 and 2.

Each leg assembly 26, etc., includes an inner bar member 30 and an outer bar member 32. Each set of bar members 30, 32, clampingly captures a spherical magnet 34 therebetween, with a first pole of the magnet positioned up. Thus, in the illustrated embodiment, there are eight spherical magnets 34 forming a first ring of magnets around and slightly above the upper plate 22 of the base unit 20. The bar members 30, 32 may be held in fixed orienting engagement with the spherical magnets 34 by screw assemblies 38.

The base assembly supports an elongate vertical shaft that extends through the center of each plate 22, 24 of base 20. In one embodiment the lower plate 24 has a circular opening and the lower end of the shaft 39 has a corresponding cylindrical shape that is received in the circular opening in press fit relationship such that it is restrained from rotating. The upper portion of the shaft 39 is cylindrical.

A circular disc 40 is mounted on the central shaft 39 such that it is free to slide up and down the shaft and to rotate about the shaft 39. The disc 40 supports a second ring of spherical magnets that co-acts with the first ring of magnets to levitate the disc 40.

The disc 40 is constructed from an upper circular plate 42 and a lower circular plate 44, which may be held together by screws 46 or other attachment devises. A low friction sleeve or bearing assembly 48 may be provided in each plate 42, 44 to facilitate low friction rotation of the disc 40. A second plurality of magnets 50, etc., provides this second ring of magnets supported within the disc 40. The magnets 50, etc., may be clampingly captured in indents bored in the plates, as best shown in the partially broken away illustration of the disc 40 of FIG. 2. In one embodiment, twenty evenly circumferentially spaced magnets form the second ring of magnets near the periphery of the circular disc 40. The magnets 50 in this second ring of magnets are positioned at about the same radial distance from the axis of the central shaft 39 as the first ring of magnets 34 mounted on the base unit 20.

An upper disc 70, supporting a third plurality of magnetic spheres 78, may be provided by attaching upper and lower plates 72, 74, as with screws 76, to clampingly capture, in a first pole down orientation, magnetic spheres 78 between plates 72, 74. The magnetic spheres 78 mounted in upper disc 70 may be located first pole down at about the same radial distance from the central shaft 39 as the magnets in the first and second rings of magnets. The upper and lower plates 72, 74, each have a central hole 79 therein that receives central shaft 39 to enable upward and downward sliding movement along shaft 39. The upper disc 70 levitates on shaft 39 above rotatable disc 40.

The orientation of the magnets in the three magnetic rings may be is follows. Each magnet has two poles. In the first ring of magnets attached around the base 20, the magnets 34 all have the same one of these two poles positioned up. This pole each of the magnetic spheres 34 that is positioned "up" is referred to herein as the "first pole" and the opposite pole is referred to herein as "the second pole." In the second ring of magnets, the magnets 50 mounted in the circular disc 40, have the first pole positioned "down." Thus, the magnets in the second ring are oriented opposite to the magnets in the first ring of magnets. In the third ring of magnets, formed by the magnetic spheres 78 in the upper disc 70, the first pole of each magnet 78 is positioned down.

As best shown by FIG. 1, a first wound coil 90 is positioned on top the base unit 20, resting on top the leg assemblies 26, 28, etc. This coil 90 has terminal ends 91, 92 that may be connected to an electrical device (not shown) to provide energy to that device. As also shown by FIG. 1, a second coil 100 is mounted on a lower surface of lower plate 74 of the upper disc 70. Electricity generated by this coil may be used to power an electrical device (not shown) that is connected at coil 100 terminal ends 101, 102. Electric current flow is generated in coils 90, 100 as a result of the coils location in the moving levitation magnetic fields, provided by the first, second and third rings of magnets, when disc 40 is rotated.

Disc 40 may be rotated by any desired method, for example, by engagement of the outer edge of the disc 40 with a rotating shaft or disc (not shown). The faster the disc 40 is rotated, the more energy it stores.

In operation, the kinetic energy storage device is assembled as shown in FIG. 1. The rotating disc 40 levitates above the first coil 90. The upper disc 70 and attached coil 100 levitate above the rotating disc 40. It is notable that the weightless rotating disc 40 produces little or no gyroscopic forces. Thus, this energy storage device 10 will not produce forces that damage the device.

The kinetic energy storage device 10 may be constructed from readily available materials. For example, all the components of the base unit 10, the rotatable disc 40 and the upper disc 70, except for the spherical magnets, may be constructed from aluminum or other nonferrous materials. The coils 90, 100 may be formed from copper or other conductive material.

A specific embodiment of a kinetic energy storage device is disclosed in detail herein. Alternative embodiments of such a kinetic energy storage device will become obvious to others skilled in the art after reading this disclosure. It is intended that the appended claims be construed to cover all such alternative embodiments, except as limited by the prior art.

What is claimed is:

1. A device for storing kinetic energy comprising:
    a base unit having a central portion and a peripheral portion and having an upright orientation;
    a central shaft having a central axis, the central shaft being mounted on the base unit in a vertical orientation when the base unit is in the upright orientation;
    a first plurality of magnets, each having opposite magnetic poles and a polar axis extending between the opposite magnetic poles, the first plurality of magnets fixedly mounted about the peripheral portion of the base unit with the polar axes of the first plurality of magnets having a vertical orientation when the base unit is in the upright orientation;
    a rotatable disc rotatably and vertically displaceably mounted on the central shaft and supporting a second plurality of magnets; the second plurality of magnets each having opposite magnetic poles and a polar axis extending between the opposite magnetic poles with the polar axes of the second plurality of magnets oriented vertically when the base unit is in the upright orientation; and
    an upper disc positioned above the rotatable disc and mounted on the central shaft in coaxial alignment therewith, the upper disc supporting a third plurality of magnets each having opposite magnetic poles and a polar axis extending between the opposite magnetic poles with the polar axes of the third plurality of magnets oriented vertically when the base unit is in the upright orientation, the first, second and third plurality of magnets co-acting to levitate the rotatable disc and maintain it in spaced apart relationship with the base unit.

2. The device of claim 1, the rotatable disc comprising a centrally mounted bearing unit that engages the central shaft.

3. The device of claim 2 wherein the base unit comprises at least one plate that has the central shaft fixedly mounted therein.

4. The device of claim 1 wherein the adjacent magnetic pole of the first and second plurality of magnets are identical magnetic poles.

5. The device of claim 4 wherein the adjacent magnetic pole of the second and third plurality of magnets are the same magnetic poles.

6. The device of claim 1 further comprising a first electrical coil positioned between the base unit and the rotatable disc.

7. The device of claim 1 further comprising a second electrical coil positioned between the rotatable disc and the upper disc.

8. The device of claim 7 wherein the polar axes of the first, second and third plurality of magnets are located in a vertically aligned ring shaped spaces, wherein gyroscopic affects produced by rotation of the rotatable disc is reduced by co-action of the first, second and third sets of magnets and first and second coils.

9. The device of claim 8 wherein the first and second coils comprise central coil axes substantially coaxial with the axis of rotation of the rotatable disc.

10. The device of claim 1 wherein at least one of the second plurality of magnets in fixedly mounted in a leg assembly attached to the peripheral portion of the base unit.

11. The device of claim 1 wherein the rotatable disc comprises first and second plates that capture the second plurality of magnets therebetween.

12. The device of claim 1 wherein the upper disc comprises first and second plates that capture the third plurality of magnets therebetween.

13. A device for storing kinetic energy comprising:
    a base assembly supporting a central vertical shaft and having a first ring of magnets mounted thereabout at a first radial distance from the central vertical shaft; and
    a rotatable disc rotatably mounted on the central vertical shaft and vertically displaceable on the central vertical shaft, the rotatable disc having a fixedly mounted second ring of magnets that are radially spaced from the central vertical shaft by approximately the first radial distance, wherein the rotatable disc weightlessly levitates above the first ring of magnets and has reduced gyroscopic precession forces;
    a second disc slidingly displaceably mounted on the central vertical shaft above the rotatable disc, the second disc having a third ring of magnets supported thereon that are radially spaced from the central vertical shaft by approximately the first radial distance;
    a lower electric coil circumscribing the central vertical shaft and positioned between the first ring of magnets and the rotatable disc;
    an upper electric coil circumscribing the central vertical shaft and attached to a bottom portion of the second disc; and wherein poles of the first ring of magnets having a first polarity are positioned up and poles of the second ring of magnets having the first polarity are positioned down.

* * * * *